(12) United States Patent
Choi et al.

(10) Patent No.: US 6,611,314 B1
(45) Date of Patent: Aug. 26, 2003

(54) APPARATUS AND METHOD FOR INJECTING LIQUID CRYSTAL MATERIAL

(75) Inventors: Su-Seok Choi, Hanam-shi (KR); Yong-Bum Kim, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 329 days.

(21) Appl. No.: 09/703,626

(22) Filed: Nov. 2, 2000

(30) Foreign Application Priority Data

Nov. 17, 1999 (KR) ........................................ 1999-50992

(51) Int. Cl.[7] ............................................ G02R 1/1330
(52) U.S. Cl. ........................................................ 349/189
(58) Field of Search ................................. 349/189, 133, 349/124

(56) References Cited

U.S. PATENT DOCUMENTS 6,208,405 B1 * 3/2001 Sakong et al. ............... 349/189

FOREIGN PATENT DOCUMENTS

| JP | 59-147324 | 8/1984 |
|---|---|---|
| JP | 07-140474 | 6/1995 |

* cited by examiner

*Primary Examiner*—James Dudek
(74) *Attorney, Agent, or Firm*—McKenna Long & Aldridge LLP

(57) ABSTRACT

A liquid crystal injection apparatus and method for injecting a liquid crystal material between substrates of a liquid crystal display panel. The method and apparatus includes using an electric field to orientate the liquid crystal material during injection such that the liquid crystal material has a reduced viscosity. The electric field can be produced by electrodes adjacent the substrates, and by an electric source that applies a potential to the electrodes. Liquid crystal material injection can be the result of capillary forces and/or differential pressure.

12 Claims, 5 Drawing Sheets

APPARATUS AND METHOD FOR INJECTING LIQUID CRYSTAL MATERIAL

This application claims the benefit of Korean Patent Application No. 1999-50992, filed on Nov. 17, 1999, which is hereby incorporated by reference for all purposes as if fully set forth herein.

BACKGROUND OF THE INVENTION

1. Field of the Invention

The present invention relates to manufacturing liquid crystal display (LCD) devices, and more particularly, to a method and apparatus for injecting liquid crystal materials into liquid crystal display panels.

2. Discussion of the Related Art

A typical liquid crystal display (LCD) panel has upper and lower substrates and an interposed liquid crystal layer. The upper substrate usually includes common electrodes, while the lower substrate includes switching elements, such as thin film transistors (TFTs), and pixel electrodes.

As the present invention relates to manufacturing liquid crystal display panels, a brief explanation about conventional liquid crystal display manufacturing processes will be helpful. Common electrodes and pixel electrodes are formed on upper and lower substrates, respectively. A seal is then formed on the lower substrate. The upper and lower substrates are then bonded together using the seal such that the common electrodes of the upper substrate and the pixel electrodes of the lower substrate are opposed to each other, and such that liquid crystal cells are formed. Liquid crystal material is then injected into those cells through injection holes. The injection holes are then sealed. Finally, polarizing films are attached to the outer surfaces of the upper and lower substrates.

In operation, the light passing through the liquid crystal cells is controlled by electric fields that are applied via the pixel and common electrodes. By controlling the electric fields desired characters or images can be displayed.

While fabricating the various components of a liquid crystal display, such as the thin film transistors or the color filters, typically require numerous manufacturing steps, the overall fabrication process is relatively straightforward. FIG. 1 illustrates a typical liquid crystal panel manufacturing process in some detail. An initial step, st1, is to form an array matrix of thin film transistors and pixel electrodes over an array (lower) substrate.

The next step, st2, is to form an orientation film over the lower substrate. This involves uniformly depositing a polymer thin film over the lower substrate and then uniformly rubbing the polymer thin film with a fabric. The rubbing process involves rubbing the surface of the polymer thin film so as to orientate the film. A typical orientation film is an organic thin film such as a polyamide thin film.

The third step, st3, is to produce a seal pattern on the lower substrate. When the upper and lower substrates are attached, the seal patterns form cell spaces that will receive the liquid crystal material. The seal pattern will also prevents the interposed liquid crystal material from leaking out of the completed liquid crystal cell. A thermosetting plastic and a screen-print technology are conventionally used to fabricate the seal pattern.

The fourth step, st4, is to spray spacers over the lower substrate. The spacers have a definite size and act to maintain a precise and uniform space between the upper and the lower substrates. Accordingly, the spacers are placed with a uniform density on the lower substrate using either a wet spray method, in which case the spacers are mixed in an alcohol and then sprayed, or a dry spray method in which only the spacers are sprayed. The dry spray method itself is divided into a static electric spray method that uses static electricity and into a non-electric spray method that uses gas pressure. Since static electricity can be harmful to the liquid crystal, the non-electric spray method is widely used.

The next step, st5, is to aligned and attach the upper and lower substrates together, and to attach color filters to the upper substrate and the lower substrate. The aligning margin, which is less than a few micrometers, is important. If the upper and lower substrates are aligned and attached beyond the aligning margin, light leaks away such that the liquid crystal cell cannot adequately performed its function.

In the sixth step, st6, the liquid crystal element fabricated through the first five steps is cut into individual liquid crystal cells. Conventionally, a liquid crystal material was injected into the space between the upper and the lower substrates before the cutting into individual liquid crystal cells. But, as displays become larger, the liquid crystal cells are usually cut first and then the liquid crystal material is injected. The process of cutting typically includes scribing using a diamond pen to form cutting lines on a substrate, and a breaking step that separates the substrate along the scribed lines.

The seventh step, st7, is to actually inject liquid crystal material into the individual liquid crystal cells. Since each individual liquid crystal cell is a few square centimeters in area, but has only a few micrometer gap between plates, a vacuum injection method is effectively and widely used. Generally, injecting the liquid crystal material into the cells takes the longest manufacturing time. Thus, for manufacturing efficiency, it is important to have optimum conditions for vacuum injection.

FIG. 2 shows a conventional vacuum injection process for injecting liquid crystal material into a liquid crystal cell. To inject the liquid crystal material, a liquid crystal cell 2 having an injection hole 4 is placed inside a vacuum apparatus 6. The liquid crystal cell is located over a vessel 8 that contains the liquid crystal material 10. During operation, suction removes air from the vacuum apparatus 6 to create a strong vacuum.

In practice it is possible for small air bubbles in the liquid crystal material 10 to gradually add together to form a larger air bubble. Such air bubbles can cause problems. Accordingly, before injection, the liquid crystal material should be left under a vacuum of a few mTorr for a sufficient time that the air bubbles in the liquid crystal material 10 are removed. Conventionally, the vessel 6 containing the liquid crystal material 10 and the liquid crystal cell 2 are all left under this vacuum condition.

One method of injecting the liquid crystal material into a liquid crystal cell is to dip the liquid crystal cell into the tray containing the liquid crystal material. However, the dipping method consumes too much of the liquid crystal material. Another method involves touching (slightly dipping) only the injection hole 4 to the liquid crystal material. Still referring to FIG. 2, in the touch method, after air in the liquid crystal cell 2 and in the liquid crystal material 10 has been removed, the injection hole 4 is slightly dipped into the vessel 8 containing the liquid crystal material 10. At first, the liquid crystal material 10 is injected into the liquid crystal cell 2 by capillary forces. Later, nitrogen gas is introduced into the vacuum apparatus 6. The difference in pressure between the interior and exterior of the liquid crystal cell 2 forces liquid crystal material 10 into the liquid crystal cell 2.

FIG. 3 is a graph illustrating the pressure in the vacuum apparatus 2 with respect to time. During period "A", a vacuum condition is being formed. At the end of period A the injection hole 4 is dipped into the vessel 8 containing the liquid crystal material 10. During period "B", the liquid crystal molecules are pressure injected into the liquid crystal cell.

After injection of the liquid crystal material is complete, the injection hole 4 is sealed with an epoxy-based sealant that is applied through a dispenser.

FIG. 4 illustrates a method of measuring the viscosity of the liquid crystal. A liquid crystal material having one of the orientations "n1", "n2", or "n3" is interposed between a fixed substrate 15 and a movable substrate 20. The movable substrate 20 is then moved parallel to the fixed substrate 15. As the movable substrate 20 moves, it produces a shear stress due to the viscosity of the liquid crystal.

As shown in FIG. 5, a liquid crystal material oriented in the direction "n1" has the highest viscosity since "n1" orientated liquid crystal molecules produce the greatest shear stress. However, liquid crystal molecules orientated in the direction "n2" have the lowest viscosity. Furthermore, liquid crystal molecules orientated in direction "n3" have an intermediate viscosity.

Conventionally, liquid crystal material is injected into a liquid crystal cell without regard to the orientation of the liquid crystal molecules. FIG. 6 shows liquid crystal molecules 50 being injected into the gap between vertically orientated orientation films 44 on the lower and the upper substrates 30 and 40 by way of a conventional vertical alignment (VA). As liquid crystal molecules 50 move in the direction of the arrow, they tend to become aligned vertically by the vertically orientated orientation films 44. That is to say, since liquid crystal molecules having the orientation "n1" are more latched by the molecules of the orientation film 44 than liquid crystal molecules having orientations "n2" or "n3," the "n1" liquid crystal molecules gather on the surface of the vertical orientation film 44 and align vertically. The liquid crystal molecules adjacent to the vertically aligned liquid crystal molecules also tend to align vertically due to a mutual interaction. As the liquid crystal molecules become more remote from the orientation film 44, the liquid crystal molecules tend to become "n3" orientated.

Since in the conventional apparatus the orientations of injected liquid crystal molecules are mainly "n1" and "n3", the injected liquid crystal material tends to have a relatively high viscosity, and thus the injection of the liquid crystal material is relatively slow.

One method of increasing the rate of injection is to inject at relatively high temperatures. However, this tends to deteriorate the liquid crystal material. Therefore, an improved method and apparatus for injecting liquid crystal material into a liquid crystal cell would be beneficial.

SUMMARY OF THE INVENTION

Accordingly, the present invention is directed to a liquid crystal injection apparatus and method that substantially obviates one or more of the problems due to limitations and disadvantages of the related art.

An object of the present invention is to increase the injection rate of a liquid crystal material into a liquid crystal cell.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

The present invention provides for a liquid crystal injection apparatus for injecting a liquid crystal material into a gap between first and second substrates. The liquid crystal injection apparatus includes a first and a second electrodes that are electrically connected to an electric source that applies a potential to the first and second electrodes such that an electric field is created between the first and the second substrates, and such that the rate of liquid crystal material injection is enhanced.

Further, the present invention provides a method of injecting a liquid crystal material into a cell. The method includes preparing first and second substrates, each substrate having an orientation film; attaching the two substrates such that the orientation films of the substrates oppose each other; applying an electric field through outer surfaces of the first and the second substrates; and injecting a liquid crystal into a space between the first and the second substrates.

The present invention further provides a method of injecting a liquid crystal material into a liquid crystal cell defined by first and second substrates. The method includes the steps of applying an electric field through first and second substrates and then injecting a liquid crystal material into a gap between the first and the second substrates. Beneficially, the liquid crystal material is injected using either a capillary force or a pressure differential between the interior and the exterior of the liquid crystal cell.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate an embodiment of the invention and together with the description serve to illustrate the principles of the invention.

In the drawings.

DETAILED DESCRIPTION OF AN ILLUSTRATED EMBODIMENT

Reference will now be made in detail to an embodiment of the present invention, which is illustrated in the accompanying drawings.

Figure 7:
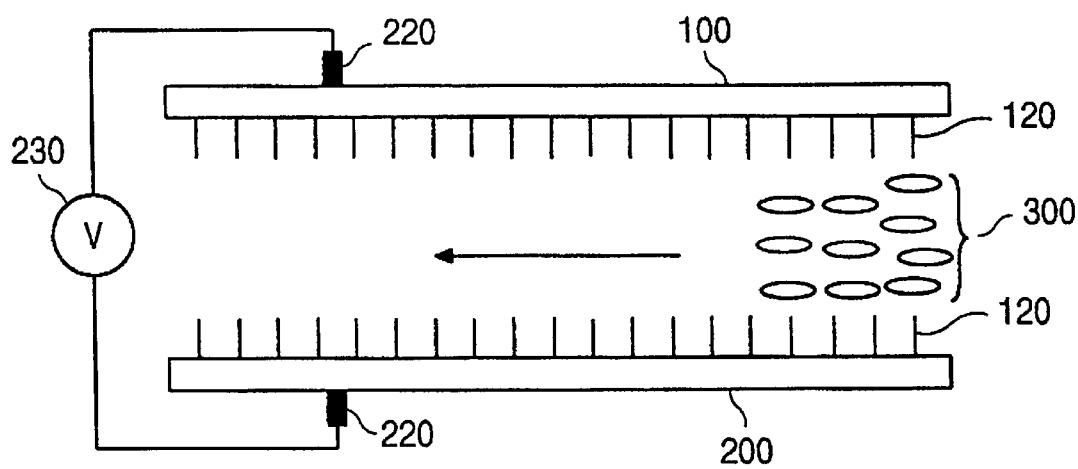
FIG. 7 conceptually illustrates the orientation of liquid crystal molecules during injection of a liquid crystal material according to the principles of the present invention.

Refer now to FIG. 7 for an illustration of the principles of the present invention. As shown in FIG. 7, an orientation film 120 is located on internal surfaces of an upper substrate 100 and a lower substrate 200. An electrode 220 is then located adjacent each external surface of the upper and the lower substrates. The electrodes are electrically connected to an electric source 230. The electric source applies an electric potential, which can be a direct or an alternating electric potential, to the electrodes 220. A liquid crystal material 300 is injected into the gap between the upper and the lower substrates in the direction of an arrow. The applied electric potential produces an electric field between the electrodes 220, and between the upper substrate 100 and a lower substrate 200. In FIG. 7, the electric field is substantially parallel to the orientations of the orientation films 120.

Figure 1:
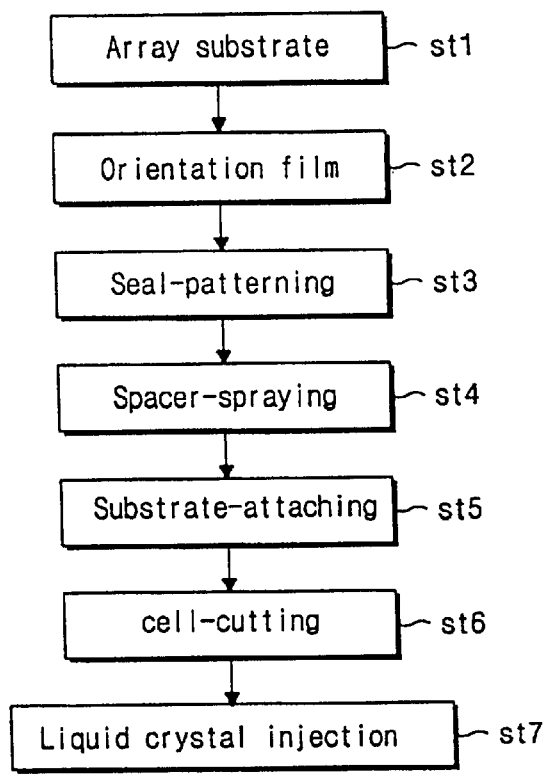
FIG. 1 is a block diagram illustrating a typical manufacturing process for a liquid crystal cell.
Figure 2:
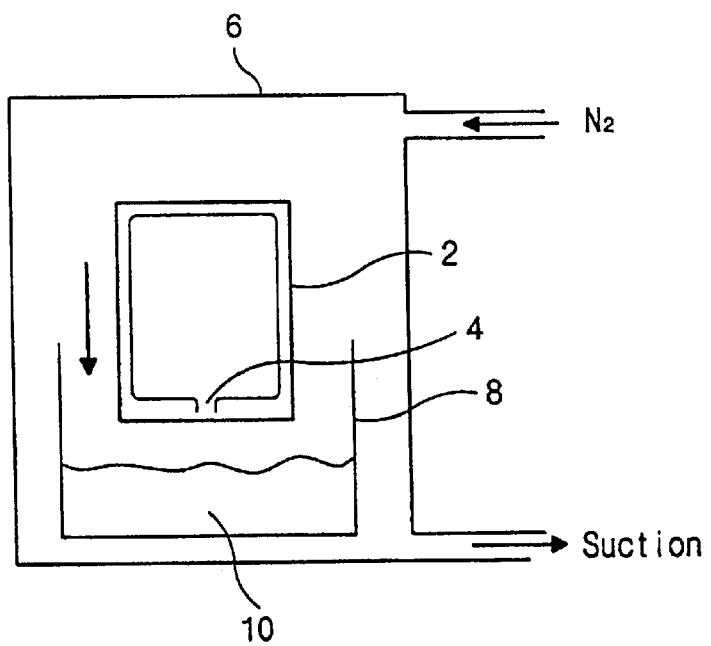
FIG. 2 illustrates a typical vacuum injection apparatus.
Figure 3:
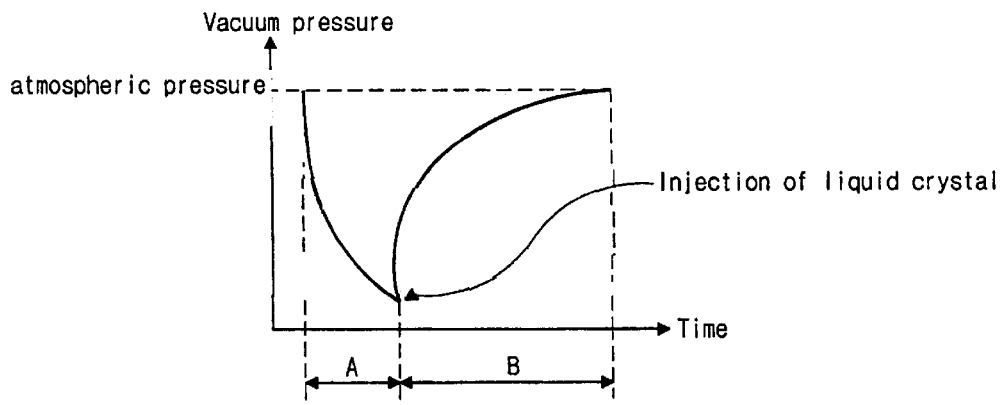
FIG. 3 is a graph of vacuum pressure verses injection time when injecting liquid crystal material into a liquid crystal cell.
Figure 4:
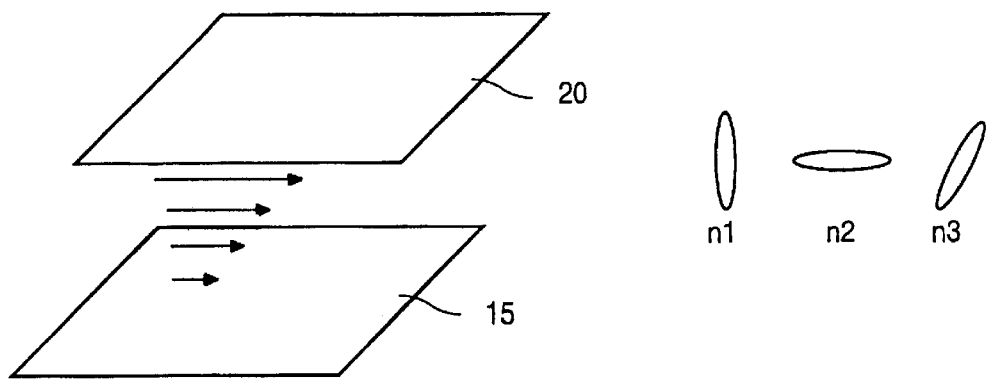
FIG. 4 illustrates a method of measuring the viscosity of a liquid crystal material.
Figure 5:
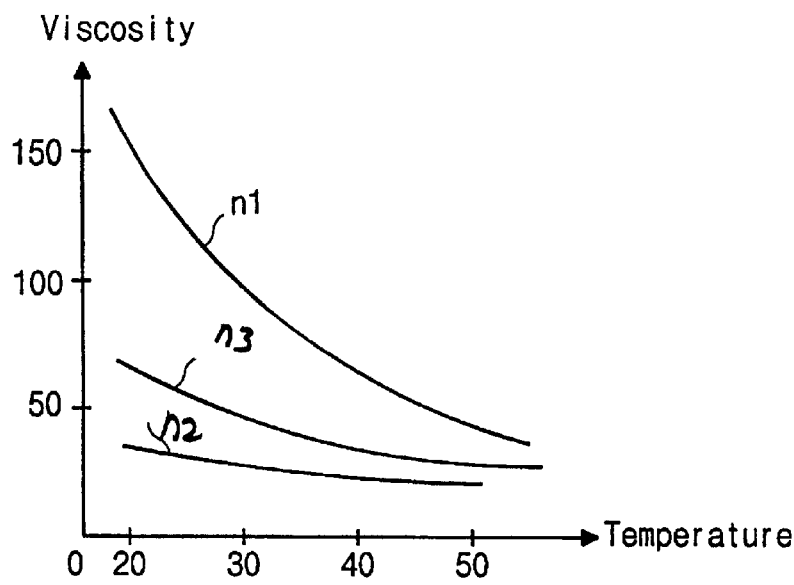
FIG. 5 is a graph of temperature verses viscosity according to various orientations of molecules of a liquid crystal material.
Figure 6:
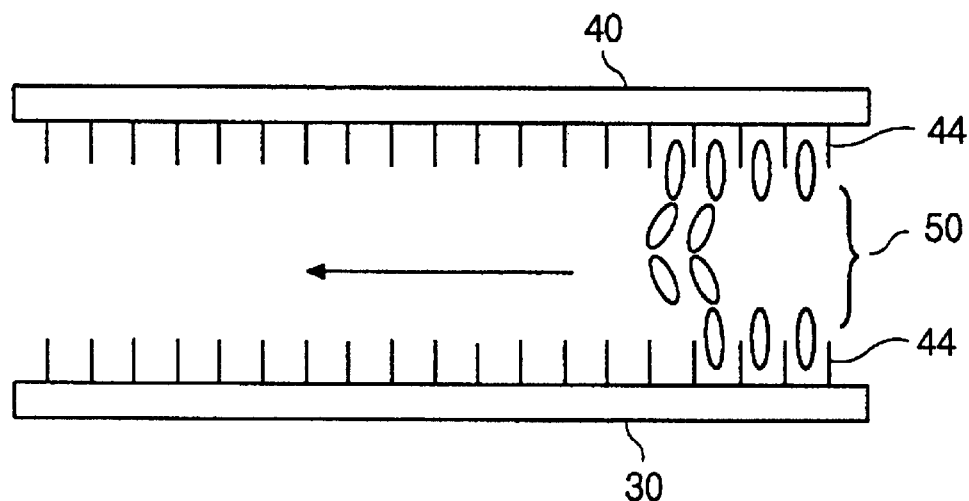
FIG. 6 conceptually illustrates the orientations of liquid crystal molecules during a conventional method of injecting a liquid crystal material.

With the electric potential applied, the molecules of the liquid crystal material rotate. Such rotation is basic to the operation of liquid crystal display devices. The present invention adopts this electrical characteristic to assist injection of the liquid crystal material. With the electric field applied, the liquid crystal molecules rotate and become aligned parallel to the surfaces of the upper substrate 100 and a lower substrate 200. Thus, the liquid crystal molecules attain the orientation "n2" shown in FIG. 4, and thus the viscosity of the liquid crystal material 300 is reduced. Accordingly, the liquid crystal material injection rate is increased.

Tests have verified that an applied electric field can increase the injection rate. With 10 volts DC applied to a test liquid crystal cell the injection rate increased by 30 to 40%.

Figure 8:
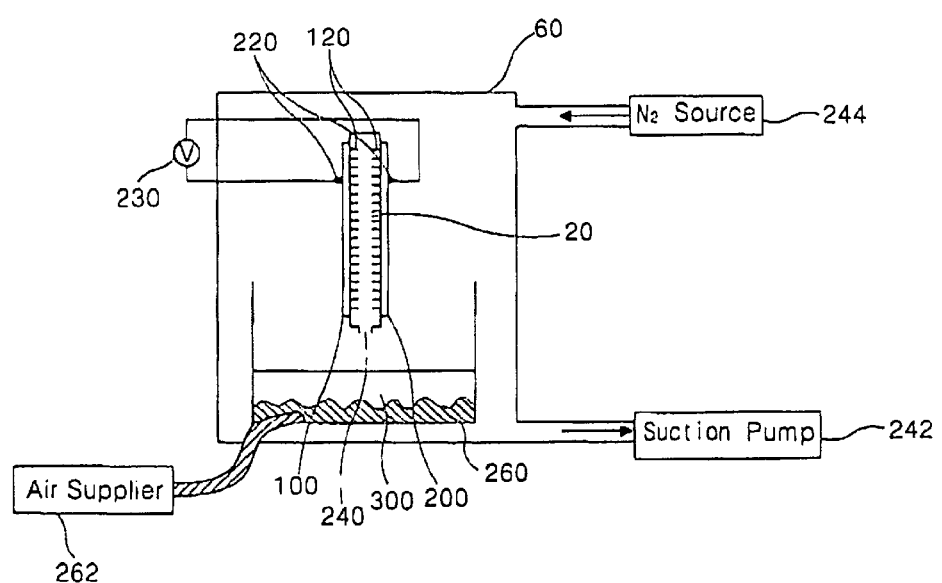
FIG. 8 illustrates a vacuum injection apparatus according to the principles of the present invention.

FIG. 8 illustrates a vacuum injection apparatus that is in accord with the principles of the present invention. A liquid crystal cell 20 having orientation films 120 on internal surfaces of substrates 100 and 200 is placed in a vacuum chamber 60. Electrodes 220 are placed adjacent the external surface of the substrates. The electrodes connect to an electric source 230. The electric source applies an electric potential to the electrodes 220, which causes an electric field to exist between the substrates 100 and 200. A liquid crystal material 300 is then injected between the substrates. This is performed by using a suction pump 242 to first evacuate the vacuum chamber 60, and then using a mechanism to cause an injection port 240 of the liquid crystal cell 20 to dip below the surface of the liquid crystal material 300. Capillary forces cause some of the liquid crystal material 300 to enter into the liquid crystal cell 20. The electric field between the substrates 100 and 200 then rotates the molecules of the liquid crystal material 300 inside the cell such that those molecules align with the substrates 100 and 200. Thus, the liquid crystal molecules attain the orientation "n2" and the viscosity of the liquid crystal material 300 inside the liquid crystal cell is reduced. Nitrogen is then supplied to the vacuum chamber by a nitrogen source 244. The resulting pressure differential between the interior and exterior of the liquid crystal cell 20 then fills the liquid crystal cell with the liquid crystal material 300.

There are many mechanisms that can cause the injection port 240 to dip below the surface of the liquid crystal material 300. For example, a mount for the liquid crystal cell can physically move the injection port 240 into the liquid crystal material 300. Alternatively, a container holding the liquid crystal material 300 can be raised. However, FIG. 8 illustrates the use of a bladder 260 in the container holding the liquid crystal material 300. When air from an air supply 262 fills the bladder 260 the bladder expands, forcing the liquid crystal material 300 over the injection port 240.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. A method of injecting liquid crystal material inside a liquid crystal cell having an injection port, and a gap between a first substrate and a second substrate, wherein each substrate include an orientation film, the method comprising;

inducing an electric field within the liquid crystal cell such that said electric field is substantially normal to said first substrate and to said second substrate; and injecting a liquid crystal material through the injection port and into the gap between the first and second substrates, wherein the electric field is induced by locating the first substrate and the second substrate between a first electrode and a second electrode and by applying a potential between the first electrode and the second electrode.

2. A method of injecting liquid crystal material inside a liquid crystal cell having an injection port, and a gap between a first substrate and a second substrate, the method comprising;

locating the liquid crystal cell inside a vacuum chamber;

evacuating the vacuum chamber and the liquid crystal cell;

inducing an electric field within the liquid crystal cell such that said electric field is substantially normal to said first substrate and to said second substrate; and dipping the injection port into a liquid crystal material, wherein the electric field is induced by locating the first substrate and the second substrate between a first electrode and a second electrode and by applying a potential between the first electrode and the second electrode.

3. A method according to claim 2, further including the step of increasing the pressure inside of said vacuum chamber such that a pressure differential between the interior of said liquid crystal cell and the exterior of said liquid crystal cell forces liquid crystal material into the liquid crystal cell.

4. A method according to claim 2, wherein the step of applying a potential between the first electrode and the second electrode applies a DC potential between the first electrode and the second electrode.

5. A method according to claim 2, wherein the step of applying a potential between the first electrode and the second electrode applies an AC potential between the first electrode and the second electrode.

6. A method of injecting liquid crystal material inside a liquid crystal cell having an injection port and a gap between a first substrate and a second substrate, wherein the first substrate and the second substrate each have an orientation film, the method comprising the steps of;

locating the liquid crystal cell inside a vacuum chamber;

evacuating the vacuum chamber and the liquid crystal cell;

inducing an electric field within the liquid crystal cell such that said electric field is substantially parallel to the orientation of said orientation film; and contacting the injection port with a liquid crystal material.

7. A method according to claim 6, further including the step of increasing the pressure within the vacuum chamber such that a pressure differential is created between the interior of the liquid crystal cell and the exterior of the liquid crystal cell, wherein the pressure differential forces liquid crystal material into the liquid crystal cell.

8. A method according to claim 7, wherein the step of increasing the pressure within the vacuum chamber includes the step of filling the vacuum chamber with a gas.

9. A method according to claim 8, wherein nitrogen fills the vacuum chamber.

10. A method according to claim 7, wherein the step of inducing an electric field within the liquid crystal cell includes the steps of:

locating the first substrate and the second substrate between a first electrode and a second electrode; and applying a potential between the first electrode and the second electrode.

11. A method according to claim 10, wherein the step of applying a potential between the first electrode and the second electrode applies a DC potential between the first electrode and the second electrode.

12. A method according to claim 10, wherein the step of applying a potential between the first electrode and the second electrode applies an AC potential between the first electrode and the second electrode.

* * * * *